(12) United States Patent
Antonik et al.

(10) Patent No.: US 7,646,326 B2
(45) Date of Patent: *Jan. 12, 2010

(54) METHOD AND APPARATUS FOR SIMULTANEOUS SYNTHETIC APERTURE RADAR AND MOVING TARGET INDICATION

(75) Inventors: Paul Antonik, Utica, NY (US); Michael C. Wicks, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 180 days.

This patent is subject to a terminal disclaimer.

(21) Appl. No.: 11/725,939

(22) Filed: Apr. 25, 2007

(65) Prior Publication Data

US 2008/0129584 A1 Jun. 5, 2008

Related U.S. Application Data

(60) Provisional application No. 60/795,979, filed on Apr. 28, 2006.

(51) Int. Cl.
*G01S 13/90* (2006.01)
(52) U.S. Cl. .................. 342/25 B; 342/28; 342/160
(58) Field of Classification Search ............... 342/59 B, 342/25 B
See application file for complete search history.

(56) References Cited

U.S. PATENT DOCUMENTS

| | | | | |
|---|---|---|---|---|
| 3,735,400 A | * | 5/1973 | Sletten et al. ............... | 342/161 |
| 3,975,734 A | * | 8/1976 | Payne ...................... | 342/25 B |
| 4,086,590 A | * | 4/1978 | Goggins, Jr. ............... | 342/25 B |
| 4,244,036 A | * | 1/1981 | Raven ........................ | 367/88 |
| 4,825,213 A | * | 4/1989 | Smrek ...................... | 342/25 B |
| 5,122,803 A | * | 6/1992 | Stann et al. ............... | 342/25 B |
| 5,327,147 A | * | 7/1994 | Caille et al. ........... | 343/700 MS |
| 5,412,414 A | * | 5/1995 | Ast et al. .................. | 342/174 |
| 5,579,011 A | * | 11/1996 | Smrek ...................... | 342/113 |
| 5,659,322 A | * | 8/1997 | Caille ...................... | 342/188 |
| 5,767,802 A | * | 6/1998 | Kosowsky et al. ........... | 342/45 |
| 5,943,010 A | * | 8/1999 | Rudish et al. ............. | 342/372 |
| 6,400,306 B1 | * | 6/2002 | Nohara et al. ............. | 342/25 R |
| 6,518,914 B1 | * | 2/2003 | Peterson et al. ........... | 342/25 R |
| 6,650,273 B1 | * | 11/2003 | Obenshain ................ | 342/25 R |
| 6,686,874 B2 | * | 2/2004 | Bickert et al. ............. | 342/174 |
| 6,691,947 B2 | * | 2/2004 | La Fata .................... | 244/3.19 |
| 6,778,138 B2 | * | 8/2004 | Purdy et al. ................ | 342/377 |
| 6,861,976 B2 | * | 3/2005 | Budic ........................ | 342/195 |
| 7,038,618 B2 | * | 5/2006 | Budic ........................ | 342/195 |
| 7,327,305 B2 | * | 2/2008 | Loehner et al. ........... | 342/25 B |
| 7,436,348 B2 | * | 10/2008 | Nohmi ...................... | 342/25 R |
| 2006/0125687 A1 | * | 6/2006 | Greeley .................... | 342/368 |
| 2007/0109179 A1 | * | 5/2007 | Werntz et al. ............. | 342/174 |
| 2007/0247353 A1 | * | 10/2007 | Budic ........................ | 342/159 |

* cited by examiner

*Primary Examiner*—Thomas H Tarcza
*Assistant Examiner*—Matthew M Barker
(74) *Attorney, Agent, or Firm*—Joseph A. Mancini

(57) ABSTRACT

Method and apparatus for simultaneous synthetic aperture radar and moving target detection. A plurality of independent radio frequency signals are generated and applied to separate radiating/receiving antenna elements. Signals are generated as basis functions, such that moving target detection and synthetic aperture radar signals are constructed from individual waveform components in space, time, frequency, and coding. Waveform components are sorted and combined at reception. Received data is simultaneously processed to extract synthetic aperture radar images and moving target indication detections.

29 Claims, 9 Drawing Sheets

METHOD AND APPARATUS FOR SIMULTANEOUS SYNTHETIC APERTURE RADAR AND MOVING TARGET INDICATION

PRIORITY CLAIM UNDER 35 U.S.C. §119(e)

This patent application claims the priority benefit of the filing date of provisional application Ser. No. 60/795,979, having been filed in the United States Patent and Trademark Office on Apr. 28, 2006 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of radar. More specifically, the present invention relates to synthetic aperture radar and moving target indication modes of such radars.

Radar has been developed to provide detection, tracking, and imaging of objects in all weather conditions using electromagnetic signals. Moving target indication is a particular mode of radar in which stationary objects are separated from objects in motion. Typically, this is accomplished by passing successive radar returns through a subtraction circuit. The returns of objects which are not moving remain the same from pulse-to-pulse, resulting in their removal through the differencing process. On the other hand, the returns of moving objects vary in phase and amplitude on successive pulses, so that the returns of targets in motion are not cancelled.

The angular resolution of a radar beam is inversely related to the physical dimensions of the radar antenna. Moving target indication is typically employed for detection and tracking functions, which require only modest radar beamwidths. At the same time, large antennas are often required to provide sufficient gain. Multiple-channel phased array antennas were developed in part to provide a wide field-of-view concurrent with fine angular resolution.

The imaging function requires a higher degree of angular resolution than detection or tracking, and therefore requires a much larger antenna. The synthetic aperture radar technique was invented to produce long virtual apertures by translating a small physical aperture in space using the motion of the host platform. As the physical aperture is moved, the signals transmitted and received by the aperture are phase-shifted and added to produce a resultant sum that is similar to that of a larger physical aperture with many elements or subarrays. The virtual aperture is M times larger than the physical aperture, where M is the number of signals integrated, and results in a corresponding improvement in spatial resolution on the ground. In strip map mode, the antenna beam of the radar system remains in a fixed angular pointing direction, and an image of the surface is formed as the beam moves over the area to be imaged due to motion of the radar platform. In spotlight synthetic aperture radar, the direction of the beam pointing changes as the platform moves to keep the beam pointing a fixed location on the ground. Multi-channel synthetic aperture radars have been developed using a phased array antenna and multiple receiver channels.

Besides different antenna provisions, synthetic aperture radar and moving target indication have conflicting waveform requirements. Synthetic aperture radar requires a wide bandwidth waveform, whereas moving target indication employs a relatively narrowband signal. The two functions also specify differing pulse repetition frequency requirements. These different demands require that synthetic aperture radar and moving target indication be performed either sequentially or using separate systems, although in some cases moving target indication information is derived from synthetic aperture radar images.

The multi-channel radio camera was invented to provide for array distortion correction in synthetic aperture and inverse synthetic aperture radar.

The frequency diverse array (U.S. patent application Ser. No. 11/312,805) was invented to provide range dependent beamforming as well as control of adaptive transmit signals for the simultaneous use of radiated energy for multiple conflicting requirements.

A limitation of the prior art is that synthetic aperture radar requires a small aperture to provide a wide beamwidth to allow long integration times, whereas moving target indication requires large apertures for high gain and narrow beamwidths.

Another limitation of the prior art is that moving target indication implemented using synthetic aperture radar has been constrained to along-track interferometry, and to image change detection, which requires that images be formed prior to the detection of moving targets.

Still another limitation of the prior art is that spot light and strip map modes of synthetic aperture radar cannot be operated simultaneously.

Yet another limitation of the prior art is that synthetic aperture radar and real-beam moving target indication cannot be performed simultaneously.

Still yet another limitation of the prior art is that a congested radio frequency spectrum constricts contiguous bandwidth available for high resolution imaging.

OBJECTS AND SUMMARY OF THE INVENTION

The present invention provides a method and apparatus to produce synthetic aperture radar and moving target indication at the same time in a manner which overcomes all of the aforementioned limitations of the prior art. The invention utilizes independent waveform generation, timing, and control across multiple apertures in a phased array radar to provide simultaneous synthetic aperture radar and moving target indication, as well as aids to navigation and embedded communications. Waveform generation produces narrowband waveform building blocks, or basis functions. Different basis functions are radiated from different antennas or elements. This permits the simultaneous transmission of multiple waveforms at different frequencies, as opposed to sequential transmission of waveforms for varied functions.

Moving target indication is applied at the building block level. An M-pulse Doppler processor is applied after M−1 two-pulse cancellers for each aperture. Doppler compensation is applied across apertures to scale for different frequencies for each spatial channel. Integration is then performed across apertures.

Wideband synthetic aperture radar waveforms are synthesized from the narrow band components across space and time utilizing interpolation and extrapolation. One monostatic and N−1 bistatic synthetic aperture radar images are formed for each of N channels. Integration is then performed across apertures and pulses.

The present invention therefore results in simultaneous moving target indication and synthetic aperture radar. The present invention also results in strip map and spotlight synthetic aperture at the same time. Alternative embodiments of the present invention provide for the simultaneous emission and processing of communications and navigation signals.

It is therefore an object of the present invention to provide an apparatus that overcomes the prior art's limitation of sequential moving target indication and synthetic aperture radar.

It is a further object of the present invention to provide an apparatus wherein spotlight and strip map synthetic aperture radar can be performed simultaneously through common equipment.

It is yet still a further object of the present invention to provide an apparatus wherein signals of multiple classes can be radiated and utilized at the same time, such as synthetic aperture radar signals simultaneously with ground moving target indication signals, or communications signals simultaneously with radar signals.

An additional object of the present invention is to overcome a fundamental limitation of conventional synthetic aperture radar, wherein a small aperture is required for long dwell and fine cross-range resolution.

Briefly stated, the present invention, method and apparatus for simultaneous synthetic aperture radar and moving target indication, achieves these and other objects through independent control of signals applied to radiating elements and through processing methods. A plurality of independent radio frequency signals are generated and applied to separate radiating/receiving antenna elements. Signals are generated as basis functions, such that moving target detection and synthetic aperture radar signals are constructed from individual waveform components in space, time, frequency, and coding. Waveform components are sorted and combined at reception. Received data is simultaneously processed to extract synthetic aperture radar images and moving target indication detections.

In the fundamental embodiment of the present invention, different waveform basis functions at different frequencies are applied to separate radiating elements, permitting the transmission of multiple signals at the same time. M pulses are transmitted from each channel, and the reflected signals from each transmission are received on all channels. Signals are reconstructed in a signal processor to perform multiple functions at the same time. For moving target indication, M−1 two-pulse cancellers are formed from M pulses at each aperture. In the preferred embodiment of the present invention, the signals at each aperture are at different frequencies, so that signals across apertures are scaled prior to Doppler filtering by $f_1/f_n$, where $f_1$ is the reference frequency and $f_n$ is the center frequency of the $n^{th}$ aperture. Phase compensation is also applied across apertures to account for waveform-to-waveform phase variation due to target complexity. Target phase information is quantized into $n_\phi$ steps, and a knowledge-based controller is used to select the appropriate phase. A sequential detector is formed across frequency bins. Integration across apertures is then performed to provide gain and beamwidth commensurate with the full array.

In an alternative embodiment, one monostatic and N−1 bistatic moving target indication processes are formed for each of N spatial channels. All $N^2$ moving target indication outputs are then combined to form a single output.

For synthetic aperture radar, a wideband signal is constructed from narrowband basis functions across multiple apertures. Interpolation and extrapolation algorithms are applied to a wide bandwidth signal over space and slow time, thus forming a real-time sequential imager. Each spatial channel also provides a conventional synthetic aperture radar, so that the full array provides a multiple-channel synthetic aperture radar capability. In an alternative embodiment, each spatial channel provides one monostatic and N−1 bistatic synthetic aperture radars, and the $N^2$ synthetic aperture radar outputs are then combined into a single integrated output.

According to an embodiment of the present invention, method and apparatus for simultaneous synthetic aperture radar and moving target indication comprises a radio frequency signal source, a series of multiplexers, a bank of amplifiers, a bank of phase shifters, an array of radiating elements, and a waveform control subsystem.

In contrast to prior art devices, the present invention produces synthetic aperture radar and moving target indication at the same time as well as spotlight and strip map modes of synthetic aperture radar at the same time. Nothing in the prior art teaches or suggests this feature of the present invention.

Therefore, it is accurate to say that the present invention (1.) can produce synthetic aperture radar and moving target indication at the same time, (2.) can produce strip map and spotlight modes of synthetic aperture radar at the same time, and (3.) provides a means to manage radar imaging bandwidth requirements in a congested radio frequency spectrum. As such, the present invention represents a significant improvement over prior art methods and apparatus.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
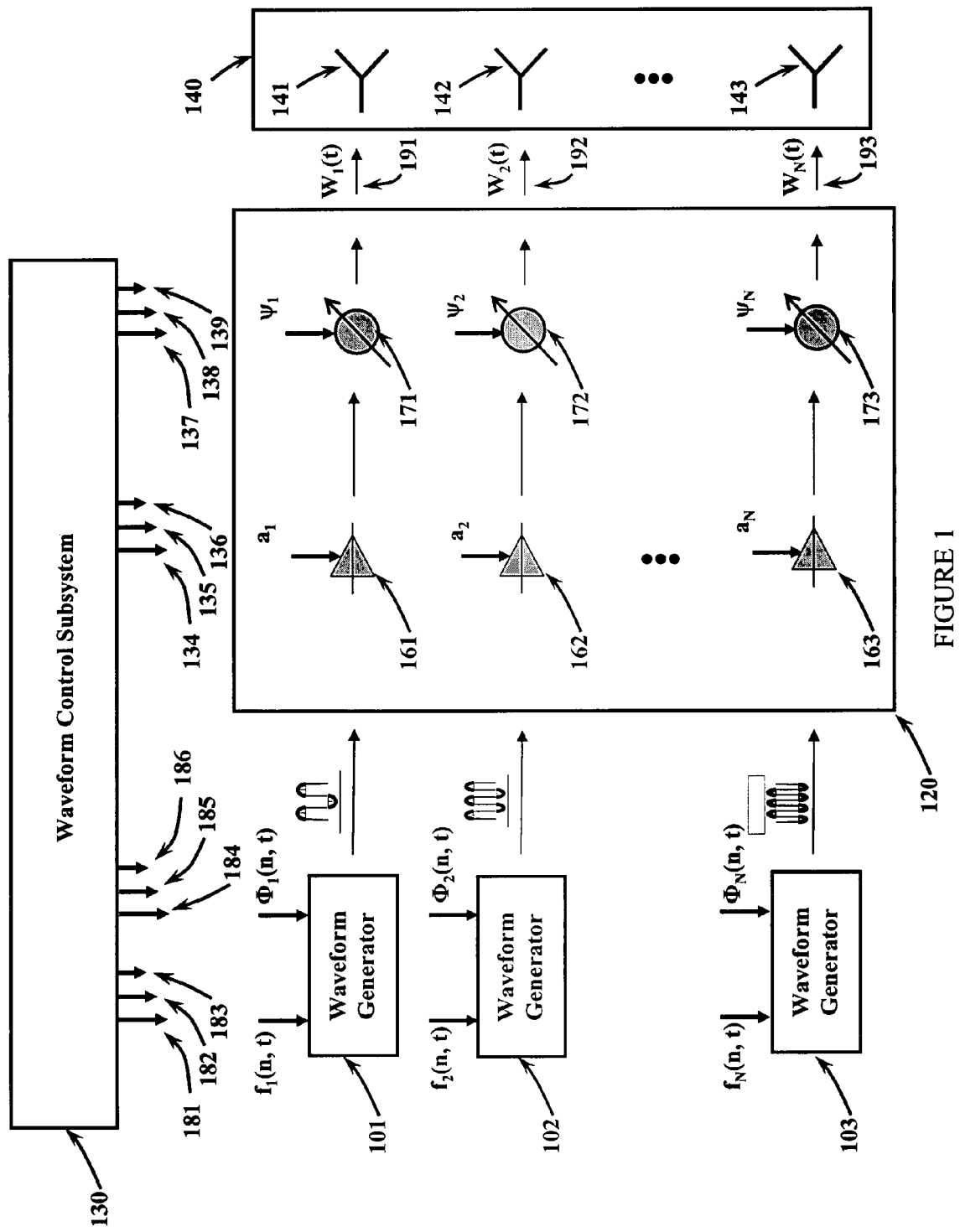
FIG. 1 is a schematic diagram representation of the present invention.

Referring to FIG. 1, the key components of a method and apparatus for simultaneous synthetic aperture radar and moving target indication include a plurality of waveform generators 101, 102, 103, a transmitter/receiver module 120, a waveform control subsystem 130, and a radiating element array 140.

A first, second through $n^{th}$ waveform generator 101, 102, 103 synthesize signals to be transmitted. The signals output from each of the waveform generators 101, 102, 103 are applied to a transmitter/receiver module 120. The waveform generators 101, 102, 103, the first, second, through $n^{th}$ inputs and outputs 191, 192, 193 of the transmitter/receiver module 120, and the first, second and $n^{th}$ antenna radiating/receiving elements 141, 142, 143 are interconnected such that any first, second, and $n^{th}$ waveform generator output can be applied to any and all first, second, through $n^{th}$ spatial channels. The outputs 191, 192, 193 of the transmit/receive module 120 are provided to a like plurality of antenna radiating/receiving elements 141, 142 through 143. A waveform control subsystem 130 provides frequency control signals 181, 182, 183 and first phase control signals 184, 185, 186 to the waveform generators 101, 102 through 103, respectively. The frequency and first phase control signals provide pulse-to-pulse and element-to-element frequency and phase diversity to the waveform generators as a function of time. The waveform control subsystem 130 further provides a plurality of amplitude control signals 134, 135, 136 and second phase control signals 137, 138, 139 to each respective amplitude control means 161, 162 and 163 and second phase control means 171, 172 and 173 of each channel, respectively, of the transmit/receive module 120. The amplitude control signals 134, 135, 136 permit power control, as well as a mechanism to apply amplitude weighting for antenna beam sidelobe control. The second phase control signals 137, 138, 139 introduce a radiating/ receive element-to-radiating/receive element phase shift for electronic beam steering and phase compensation and correction. The frequency control signals 181, 182, 183 and the first phase control signals 184, 185, 186 permit the radiation of multiple signal modes at the same time.

Still referring to FIG. 1, a plurality of spatial channels is depicted. The actual number of transmitter/receiver module 120 signal outputs $W_1(t) \ldots W_N(t)$ 191, 192 and 193 in the preferred embodiment depends upon the number of antenna elements 141, 142, and 143. It follows that the number of amplifiers 161, 162 and 163 and phase shifters 171, 172 and 173 will be identical to the number of antenna radiating/ receiving elements 141, 142, and 143.

Figure 2:
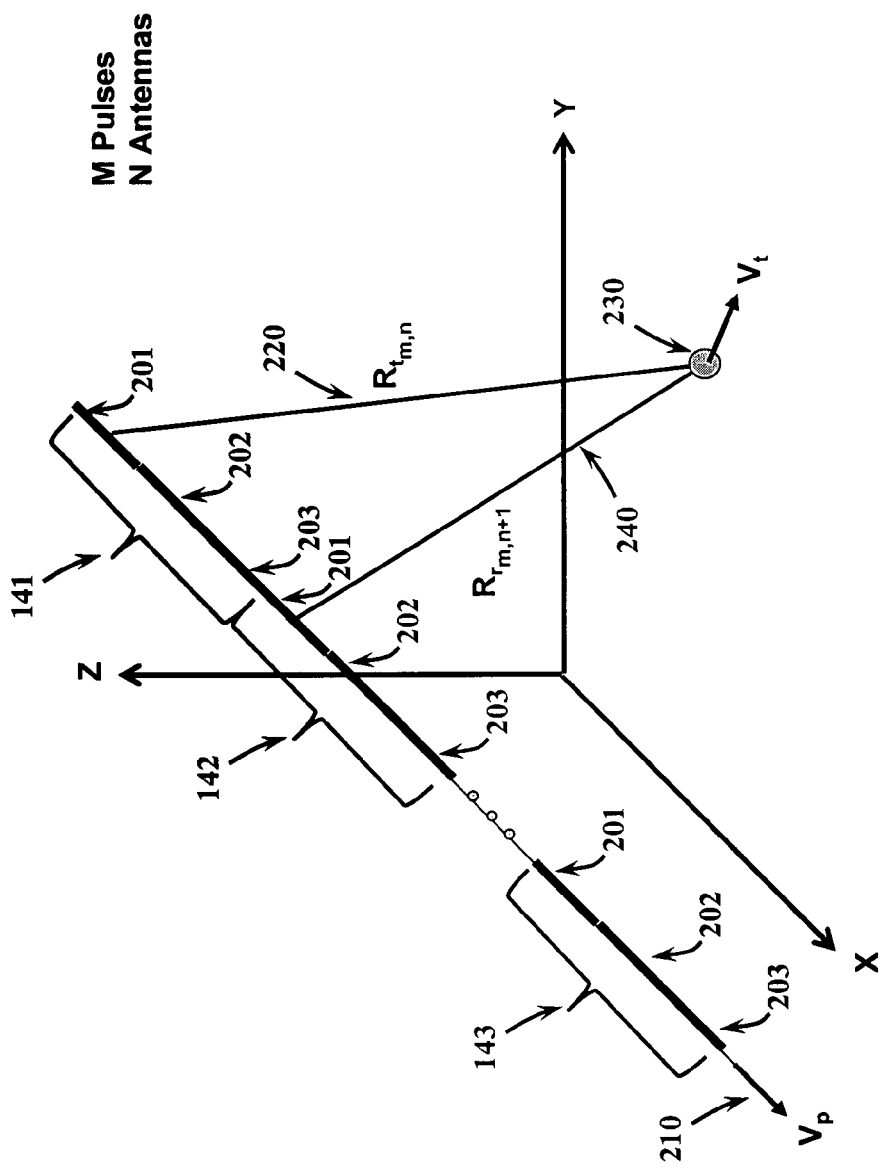
FIG. 2 is a graphical representation of a method of multichannel space-time illumination for simultaneous synthetic aperture radar and moving target indication.

Referring now to FIG. 2 a method of multi-channel space-time illumination for simultaneous synthetic aperture radar and moving target indication is depicted. Signals from multiple radar pulses 201, 202, and 203 are radiated over time from each first, second through $n^{th}$ antenna radiating/receiving elements 141, 142, and 143 as the aperture translates due to platform motion (depicted as vector $V_p$) 210. The transmission 220 of the $m^{th}$ pulse from the $n^{th}$ antenna (denoted as $Rt_{m,n}$) is reflected from a target 230 on the ground, which may be moving. The reflected signal is received at all spatial channels, thus forming one monostatic response and N−1 bistatic responses for each channel, where N refers to the number of antenna radiating/receiving elements. FIG. 2 shows the reflected signal (denoted as $Rr_{m,n+1}$) 240 for the $m^{th}$ pulse received at the $(n+1)^{th}$ element. In general, all waveforms are not identical for each spatial channel. Waveforms may be orthogonal, or nearly orthogonal, to simplify signal separation on receive. Still referring to FIG. 2, the case where subarrays (spatial channels) are not overlapped and signals do not overlap in time is depicted. In general, subarrays and temporal signals may overlap.

Figure 3:
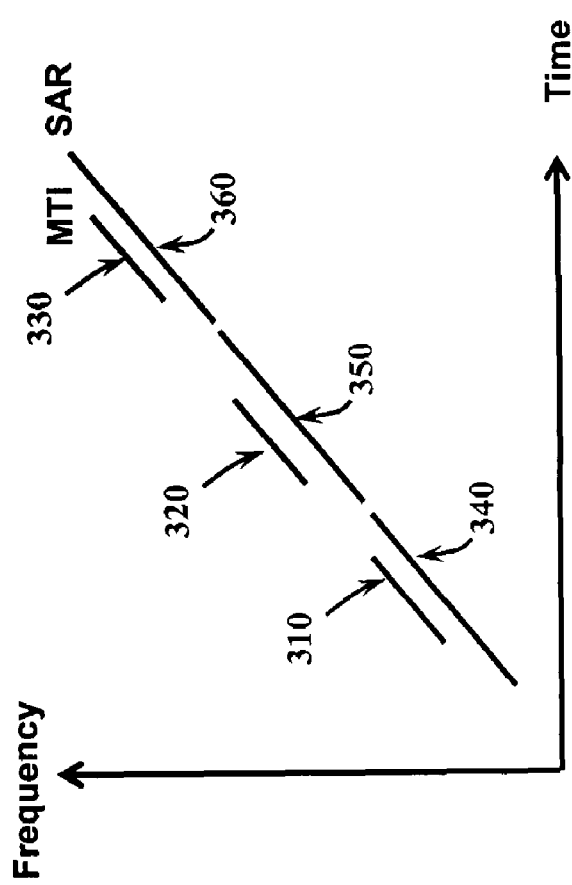
FIG. 3 is a graphical representation of frequency versus time across spatial channels for separate moving target indication and synthetic aperture radar illuminations.

Referring now to FIG. 3 methods of illumination are compared for separate moving target indication and synthetic aperture radar modes in frequency versus time. Moving target indication signals 310, 320, and 330 are radiated from antenna radiating/receiving elements 141, 142, and 143 (see FIG. 1, see also, FIG. 2) respectively and are relatively narrow band and short duration. Alternatively, synthetic aperture radar signals 340, 350, and 360 are radiated from antenna radiating/receiving elements 141, 142, and 143 and are relatively wide band and long duration. The moving target indication signals can be considered to be subsets of the synthetic aperture radar signals.

Figure 4:
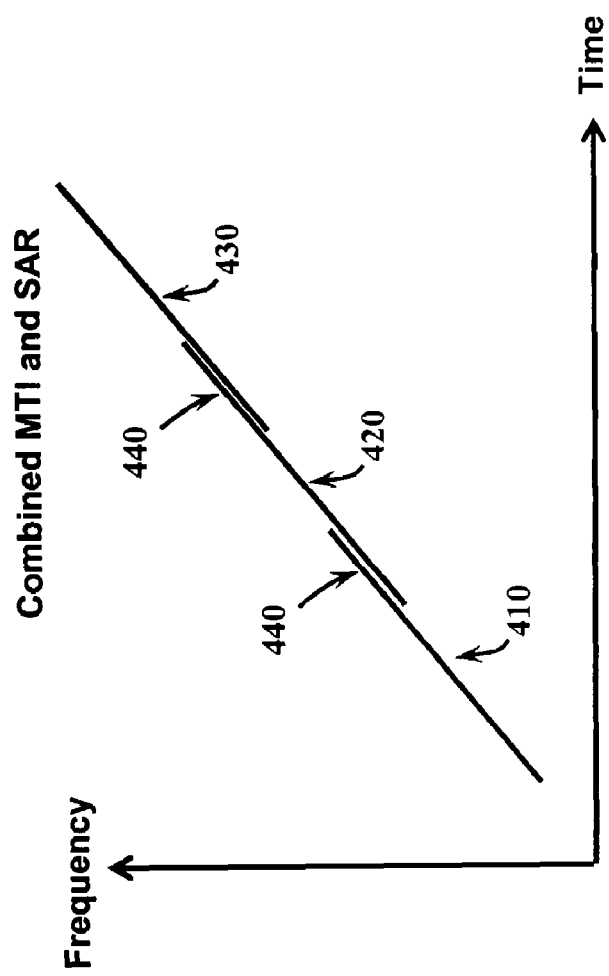
FIG. 4 is a graphical representation of frequency versus time across spatial channels for combined moving target indication and synthetic aperture radar.

Referring now to FIG. 4, a space-time illumination to achieve synthetic aperture radar and ground moving target indication at the same time is depicted in frequency versus time. Signals 410, 420, and 430 are radiated from elements 141, 142, and 143 respectively (see FIG. 1, see also, FIG. 2). In general, the signals radiated from multiple elements overlap in time 440, creating a phased array effect. In the prior art, synthetic aperture radar and ground moving target indication are inherently disparate processes. Synthetic aperture radar is an integration process which requires on the order of hundreds of megahertz of bandwidth to achieve sufficient range resolution for imaging. Ground moving target indication is a differencing process that requires only several megahertz of bandwidth for detection. The present invention permits modes to be constructed to support synthetic aperture radar and ground moving target indication at the same time by providing chirp diversity and phase modulation across the transmit/receive elements 141, 142 through 143 (see FIG. 1, see also, FIG. 2), and processing all elements in combination and individually.

Figure 5:
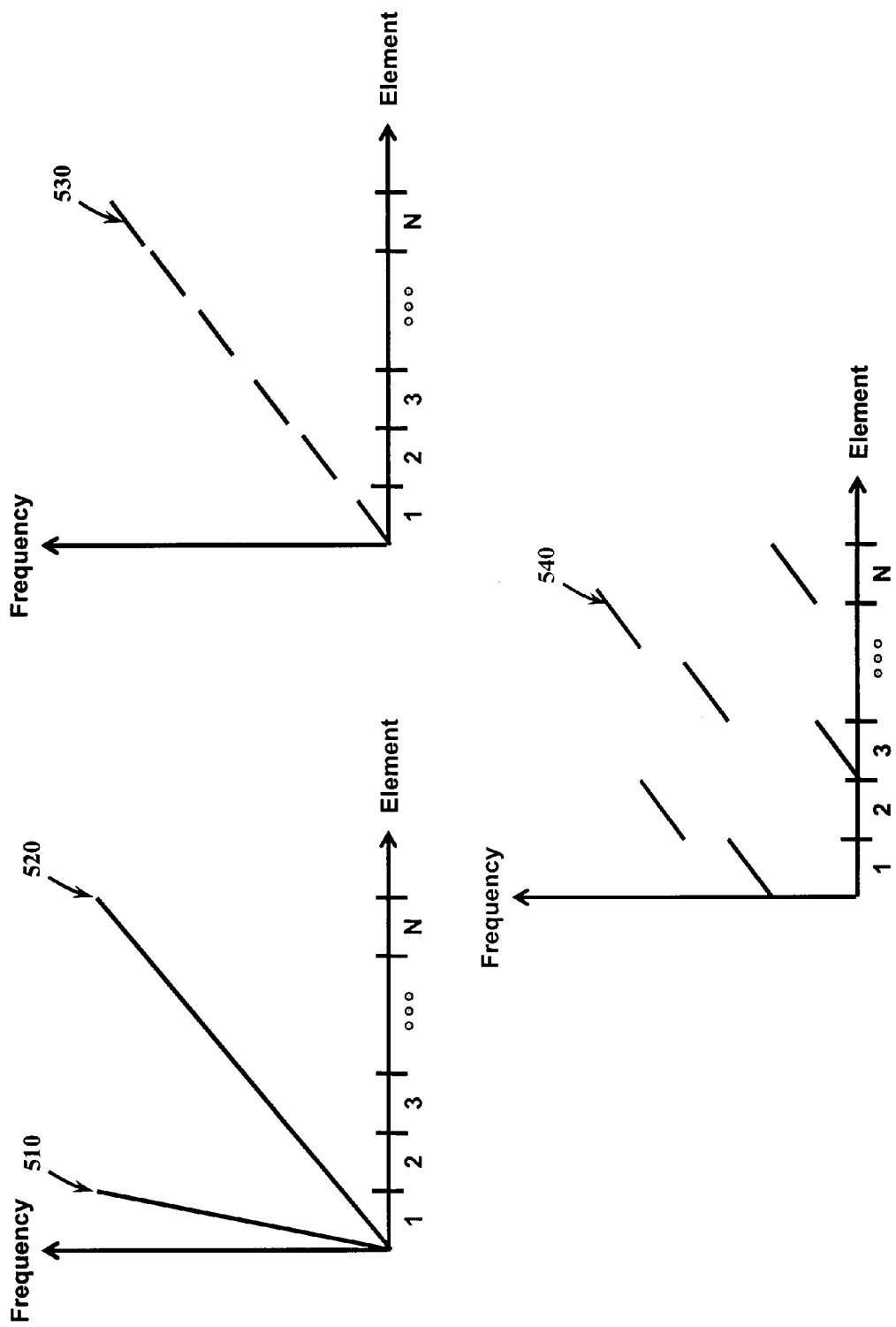
FIG. 5 is a graphical representation of various arrangements of frequency versus spatial channel for a synthetic aperture radar mode of the present invention, compared to illumination for conventional synthetic aperture radar.

Referring now to FIG. 5 methods of illumination are depicted for conventional 510 and sequential imaging 520 modes utilizing the present invention in a frequency versus number of radiating/receiving elements representation. In conventional synthetic aperture radar, a single radiating channel is used to radiate a wideband pulse. In the sequential imaging mode, portions of the full imaging signal, or basis functions, are radiated from each spatial channel, and the full signal is reconstructed in the signal processor. It is not necessary for the signals from adjacent elements to be contiguous. Multi-element signal 530 is constructed from a plurality of basis functions, each containing a non-contiguous portion of the full bandwidth signal. Extrapolation and interpolation is utilized to determine full signal content. Any combination of signals provides the full transmitted signal. Signal 540 represents a highly non-contiguous set of basis functions, which sum to the same signal 520.

Figure 6:
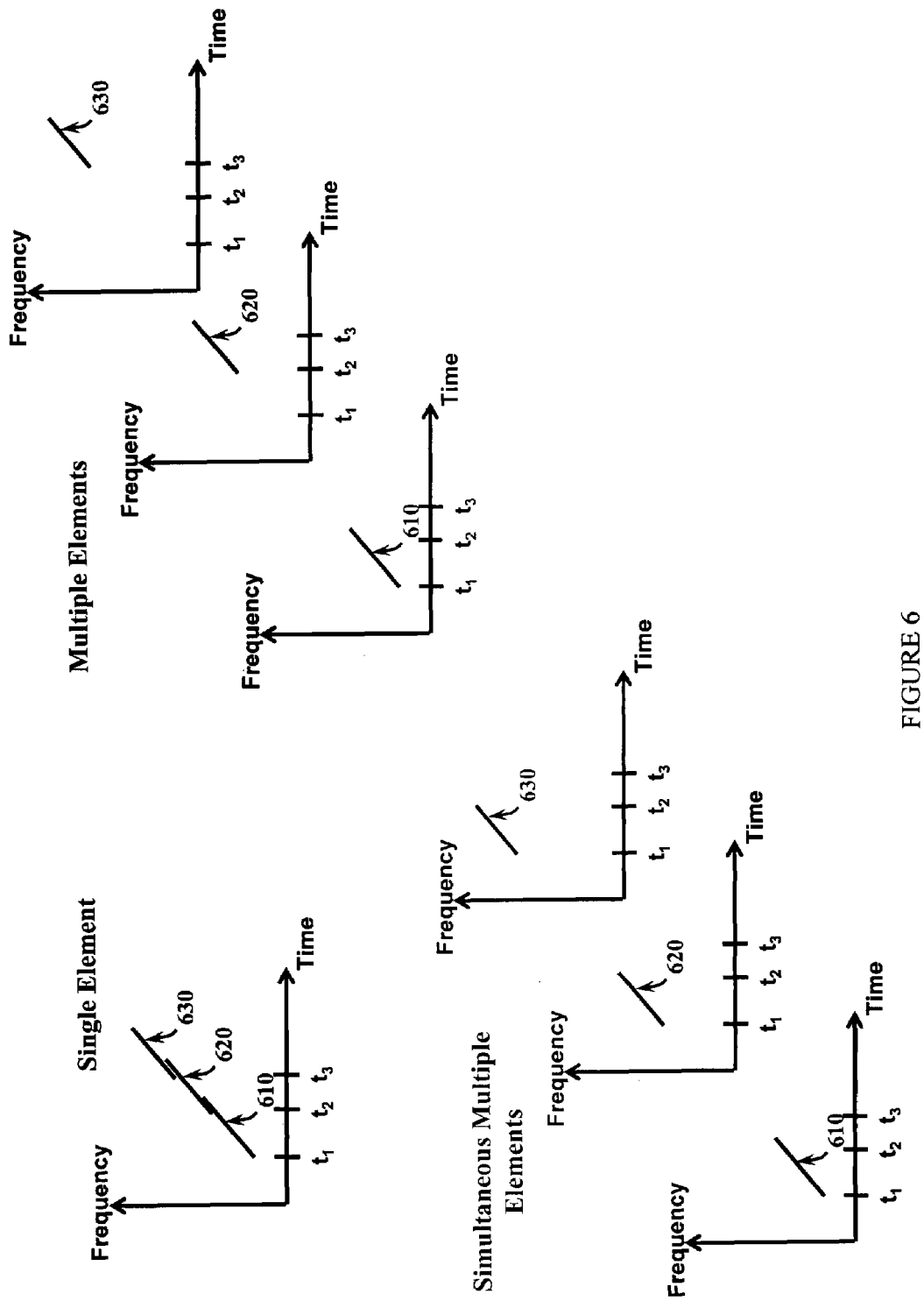
FIG. 6 is a graphical representation of various arrangements of frequency versus time and spatial channel for simultaneous synthetic aperture radar and moving target indication.

Referring now to FIG. 6, various methods of illumination are depicted for arranging combined moving target indication and synthetic aperture radar signals in a frequency, space, and time representation. Signals 610, 620, and 630 are different waveforms radiated from a single radiating/receiving element 141 (see FIG. 1, see also, FIG. 2). Alternatively, signals 610, 620, and 630 are radiated separately from elements 141, 142, and 143 (see FIG. 1, see also, FIG. 2) respectively. Alternatively, signals 610, 620, and 630 are radiated from elements 141, 142, and 143 respectively at the same time.

Figure 7:
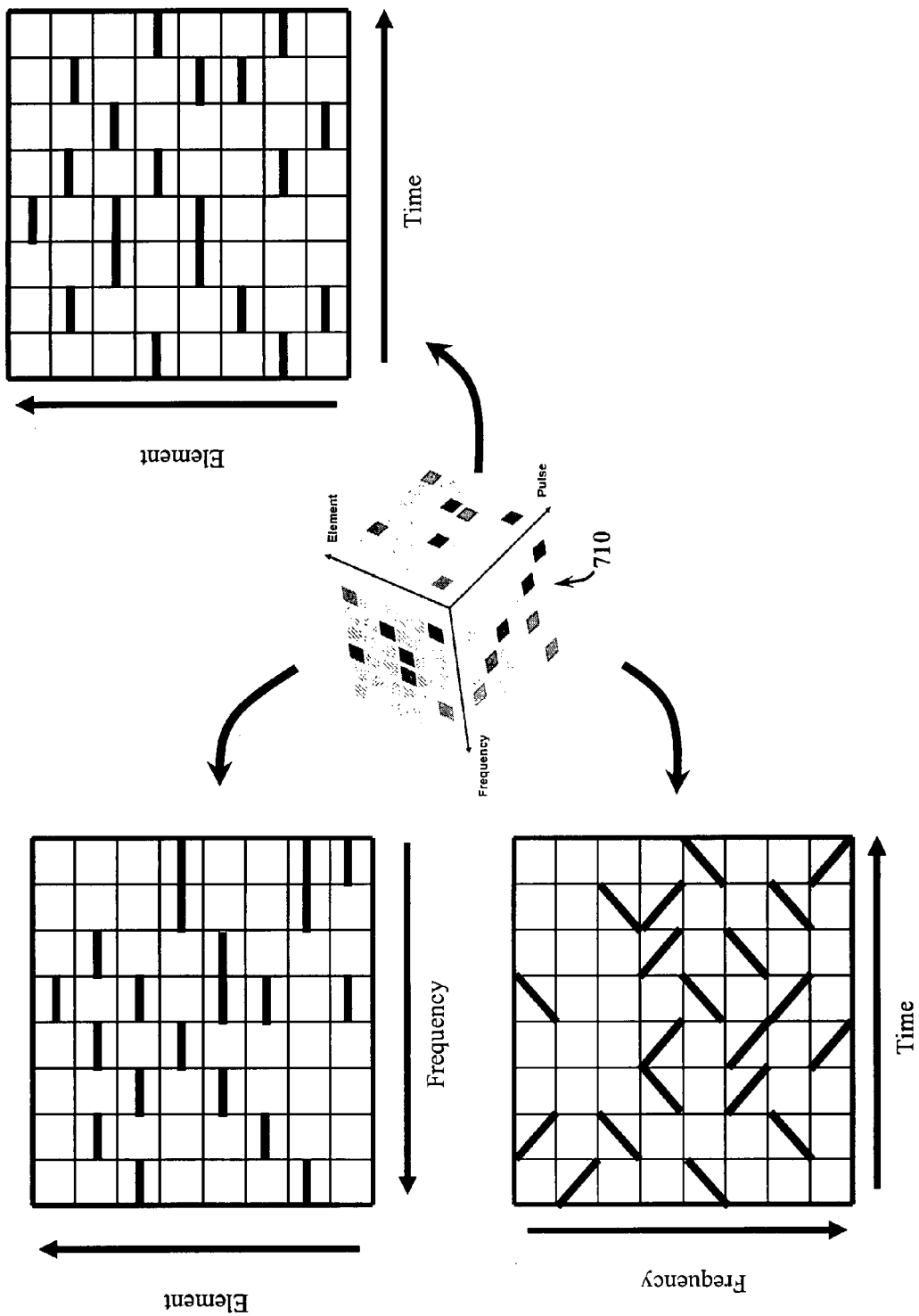
FIG. 7 is a graphical representation of arrangement of data from all pulses at all elements for processing for simultaneous synthetic aperture radar and moving target indication.

Referring now to FIG. 7, a generalized data cube 710 is depicted which is formed from the basis functions received at all elements for all radar pulses. The received data cube is then processed simultaneously to extract moving target indication target detections and synthetic aperture radar images.

Figure 8:
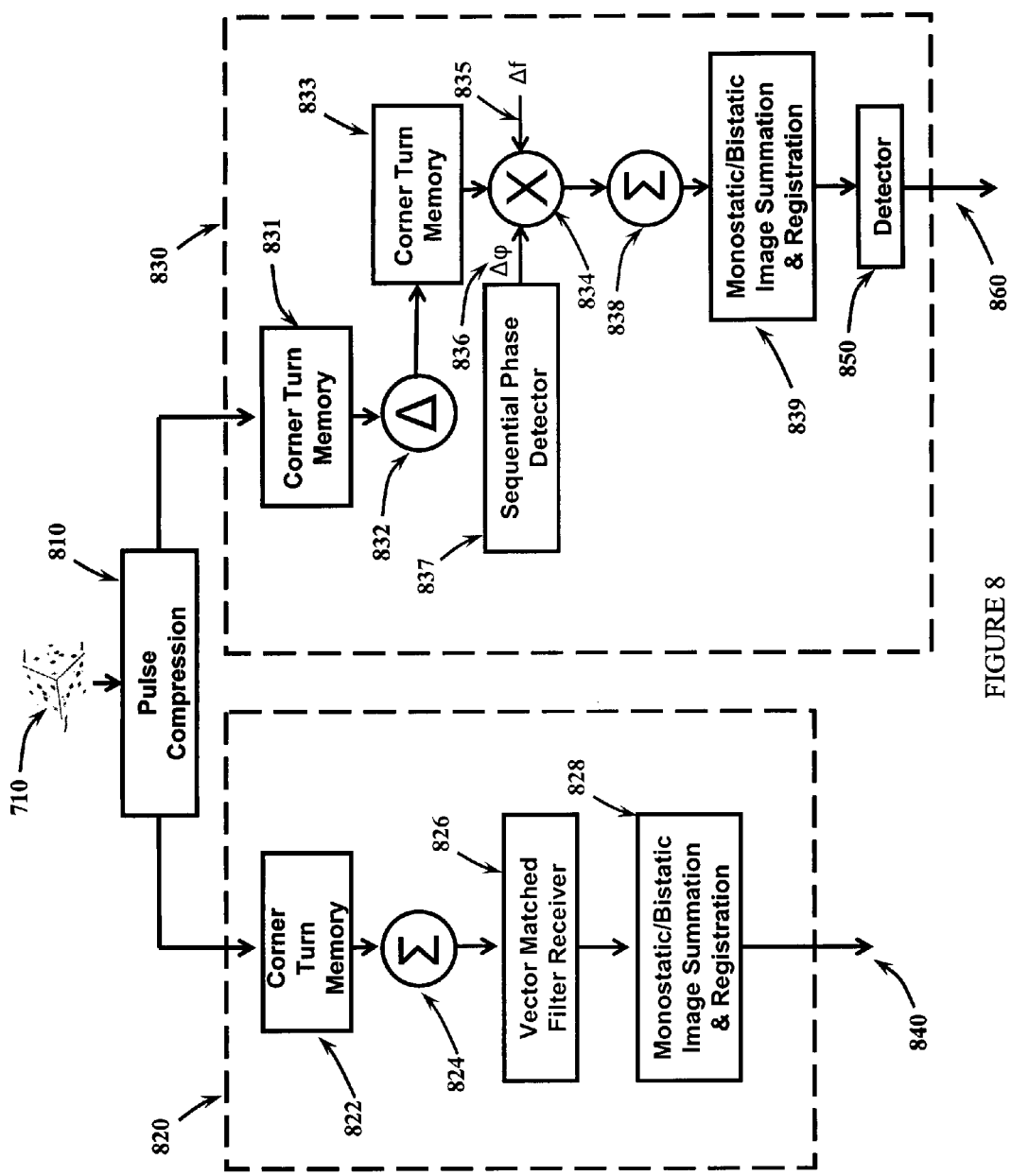
FIG. 8 is a schematic diagram representation of a method and apparatus for the processing of data for simultaneous synthetic aperture radar and moving target indication.

Referring now to FIG. 8, a method and apparatus is depicted for the simultaneous processing of received basis functions at all elements for synthetic aperture radar imaging and moving target indication. Generalized data cube 710 is input to pulse compression unit 810. Pulse compressed data is then passed simultaneously to the synthetic aperture radar processor 820 and moving target indication processor 830. The synthetic aperture radar processor first utilizes a corner turn memory 822 to arrange the input data by pulses. An accumulator 824 then sums received signals over pulses. A vector matched filter receiver 826 is applied over all spatial channels, followed by a registration unit 828 to combine returns from all combinations of monostatic and bistatic pairs. Image 840 is output from the synthetic aperture radar processor 820.

Still referring to FIG. 8, moving target indication processor 830 first utilizes corner turn memory 831 to arrange data by pulses. The corner turn memory output is applied to a differencing unit 832, which contains M−1 two-pulse canceller circuits at each frequency, where M is the number of radar pulses. Corner turn memory 833 is utilized to arrange data by aperture or element. Multiplier 834 applies frequency 835 and phase 836 compensation signals. Frequency compensation signal 835 applies a frequency scale of Doppler components for each aperture. Doppler components are scaled by $f_1/f_n$, where $f_1$ is the reference frequency and $f_n$ is the carrier frequency of the $n^{th}$ element. Phase compensation signal 836 corrects phase variation across waveforms due to target complexity, and is generated by sequential phase detector 837. Doppler and phase compensated signals are then input to accumulator 838, which coherently integrates signals across apertures and moving target indication filters. Registration unit 839 combines returns from all combinations of monostatic/bistatic pairs. Detector 850 performs magnitude detection, threshold setting, and detection declaration. Detections 860 are output from the moving target indication processor 830.

Figure 9:
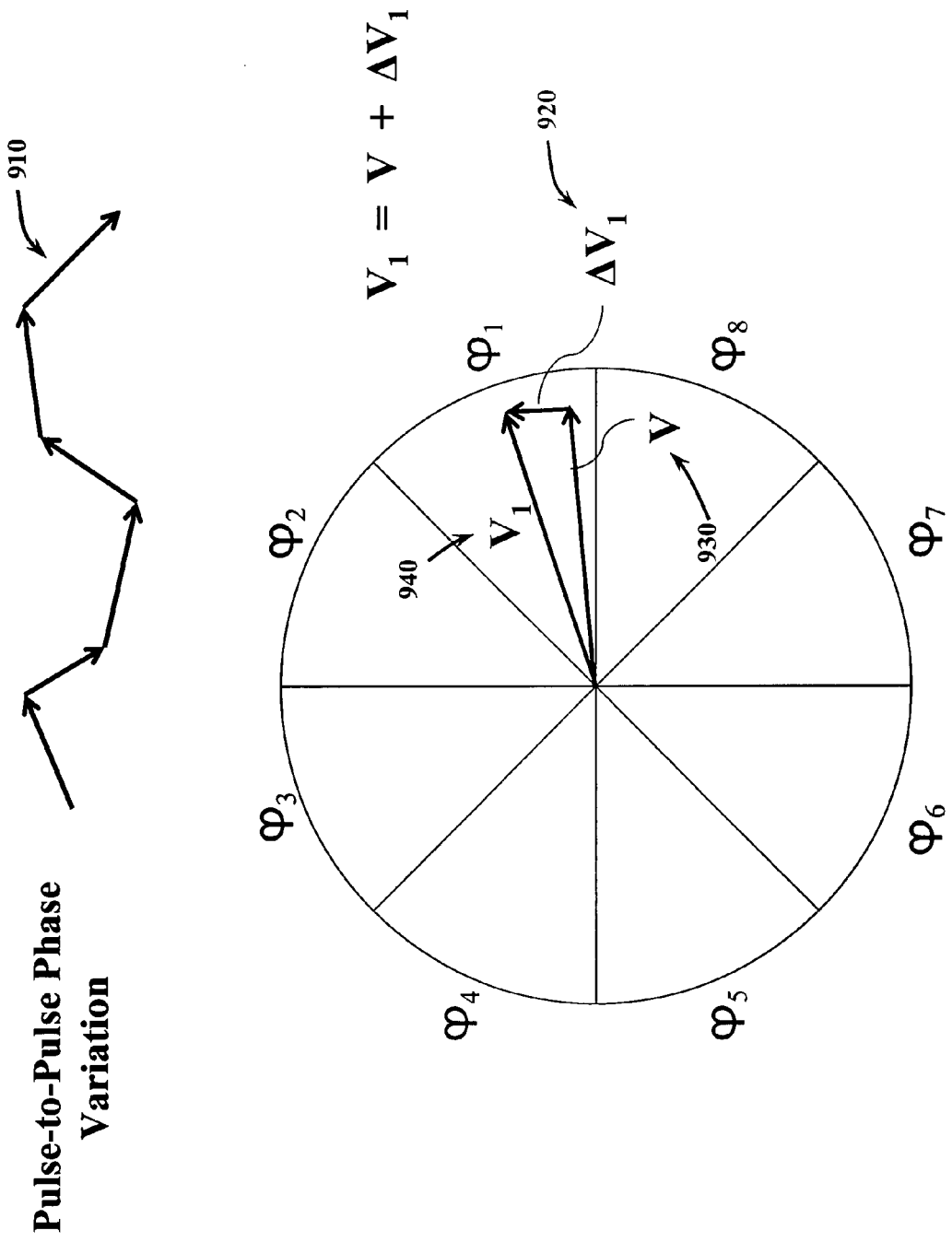
FIG. 9 is a graphical representation of a sequential phase detector.

Referring now to FIG. 9, operation of sequential phase detector 837 (see FIG. 8) is depicted. Target complexity and varying carrier frequency introduce a phase variation from waveform-to-waveform, which can be represented as a series of vectors 910. To achieve phase compensation prior to coherent integration across waveforms, an incremental vector $\Delta V_1$ 920 is added to received vector V 930 to achieve quantized phase $V_1$ 940. Phase is quantized into $N_\phi$ steps. Referring still to FIG. 9, eight steps are shown, although finer partitioning is possible. Phase quantization can be performed with the aid of a knowledge-based controller to account for known variation of frequency across waveforms.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for producing simultaneous synthetic aperture radar and moving target indication, comprising:
   a plurality of waveform generators each producing as an output an independent radio frequency signal so as to produce a plurality of independent radio frequency signals;
   wherein each of said plurality of waveform generators being independently controllable in frequency and phase;
   a transmit/receive module having
      a plurality of inputs and outputs, and
      a channel disposed between each corresponding pair of said plurality of inputs and outputs;
   wherein each of said plurality of inputs of said transmit/receive module being connected to the corresponding output of each said plurality of waveform generators, and
   wherein said transmit/receive module further comprises means for:
   modulating the amplitude and phase characteristics of at least one of said plurality of radio frequency signals transiting in either direction therethrough;
   modulating any of said characteristics independently of any of said other characteristics; and
   modulating any of said characteristics of any of said plurality of radio frequency signals independently of any other of said plurality of radio frequency signals;
   a waveform control subsystem having means for applying signals to:
   any of said plurality of waveform generators so as to control the frequency and phase of said radio frequency signal output therefrom; and
   any of said disposed channels of said transmit/receive module so as to control said means for modulating said amplitude and phase characteristics;
   at least one radio frequency radiating/receiving element being connected to at least one of said transmit/receive module outputs for
      radiating radio frequency signals into free space, and
      receiving from free space radio frequency signals reflected from targets; and
   a signal and data processor for extracting synthetic aperture image data and moving target indication data from received radio frequency signals.

2. The apparatus of claim 1, wherein said means for modulating said amplitude and phase characteristics further comprises means for radio frequency signal amplifying and phase shifting.

3. The apparatus of claim 1, wherein said means for applying signals to any of said plurality of waveform generators, further comprises:
   a frequency control signal channel; and
   a first phase control signal channel
   corresponding to each of said plurality of waveform generators; and
   wherein said means for applying signals to any of said disposed channels of said transmit/receive module further comprises:
      an amplitude control signal channel; and
      a second phase control signal channel
   corresponding to each of said disposed channels of said transmit/receive module.

4. The apparatus of claim 3, wherein said means for applying signals further comprises a means for imparting a frequency characteristic to said signals that:
   is independently scalable in frequency; and
   that increases for each successive said waveform generator, from a minimum frequency value at the first said waveform generator and to a maximum frequency value at the Nth said waveform generator
   for each of said frequency control signal channels.

5. The apparatus of claim 4, wherein said frequency characteristic varies linearly with time.

6. The apparatus of claim 4, wherein said frequency characteristic varies over time, during the time interval between successive pulses.

7. The apparatus of claim 3, wherein said means for applying signals further comprises a means for providing:
   an independently scalable amplitude characteristic for each of said amplitude control signal channels.

8. The apparatus of claim 3, wherein said means for applying signals further comprises a means for providing:
   an independently scalable phase characteristic for each of said first phase control signal channels; and
   said second phase control signal channels.

9. The apparatus of claim 8, wherein said phase characteristic of said first and said second phase control signal channels varies with time.

10. The apparatus of claim 8, wherein said phase characteristic of said first and said second phase control signal channels varies during the interval between one pulse to the next pulse, with time.

11. The apparatus of claim 2, wherein the input of said means for amplifying is connected to said input of each said channel;
the output of said means for amplifying is connected to the input of said means for phase shifting; and
the output of said means for phase shifting is connected to said output of each said channel.

12. The apparatus of claim 1, wherein each of said plurality of inputs of said transmit/receive module may be connected to any quantity of said outputs of said plurality of waveform generators, in any combination.

13. Method for producing simultaneous synthetic aperture radar and moving target indication, comprising the steps of:
generating a plurality of independent radio frequency signals, each of said plurality having
an independently variable frequency; and
an independently variable first phase characteristic;
applying frequency and first phase control signals so as to effectuate said variability;
a first step of channelizing each of said plurality of independent radio frequency signals, wherein each of said plurality of channels has a corresponding input and output;
applying amplitude and second phase control signals so as to vary the amplitude and second phase characteristics of at least one of said plurality of channels so as to modulate the amplitude and phase of said channelized radio frequency signals transiting in either direction therethrough, said step of applying further comprising:
varying any of said characteristics independently of any of said other characteristics; and
varying any of said characteristics of any of said plurality of channels independently of any other of said plurality of channels;
radiating into free space at least one of said plurality of modulated, channelized radio frequency signals through at least one radio frequency radiating/receiving element being connected to at least one of said outputs of said plurality of channels; and
receiving from free space radio frequency signals reflected from targets; and
extracting synthetic aperture image data and moving target indication data from said received radio frequency signals.

14. The method of claim 13, wherein said step of varying any of said characteristics further comprises the steps of radio frequency signal amplification and phase shifting.

15. The method of claim 13, further comprising:
a second step of channelizing said frequency control signals so as to produce said independently variable frequency; and
a third step of channelizing said first phase control signals so as to produce said independently variable first phase characteristic
corresponding to each of said plurality of independent radio frequency signals.

16. The method of claim 15, wherein said step of applying amplitude and second phase control signals further comprises:
a fourth step of channelizing said amplitude control signals so as to vary the amplitude of said channelized radio frequency signals; and
a fifth step of channelizing said second phase control signals so as to vary said second phase characteristic of said channelized radio frequency signals.

17. The method of claim 15, wherein said second step of channelizing frequency control signals further comprises the step of independently scaling said frequency control signals such that:
said independently scaled frequency increases for each successive independent radio frequency signal of said plurality of independent radio frequency signals, from a minimum frequency value of the first said independent radio frequency signal to a maximum frequency value for the Nth said independent radio frequency signal, for each of said frequency control signal channels.

18. The method of claim 17, where, in said step of scaling frequency control signals, said scaling varies linearly with time.

19. The method of claim 17, where, in said step of scaling frequency control signals, said scaling varies over time, during the time interval between successive pulses.

20. The method of claim 16, wherein said fourth step of channelizing said amplitude control signals further comprises the step of:
independently scaling the amplitude of each of said amplitude control signal channels.

21. The method of claim 15, wherein said third step of channelizing said first phase control signals further comprises the step of:
independently scaling the phase characteristic for each of said first phase control signal channels.

22. The method of claim 16, wherein said fifth step of channelizing said second phase control signals further comprises the step of:
independently scaling the phase characteristic for each of said second phase control signal channels.

23. The method of claim 13, wherein said step of applying first phase control signals and second phase control signals further comprises applying in a manner such that said first phase characteristic and said second phase characteristic vary with time, independently of each other.

24. The method of claim 13, wherein said step of applying first phase control signals and second phase control signals further comprises applying in a manner such that said first phase characteristic and said second phase characteristic vary during the interval between one pulse to the next pulse, with time, independently of each other.

25. The method of claim 13, wherein said step of applying amplitude and second phase control signals further comprises the steps of:
amplifying said radio frequency signals in any of said plurality of channels, wherein said amplification is controlled by the application of said amplitude control signals; and
phase shifting said amplified radio frequency signals, wherein said phase shifting is controlled by the application of said second phase control signals;
wherein neither the occurrence of said amplification nor said phase shifting is dependent upon the occurrence of the other.

26. The method of claim 13, wherein said step of applying said frequency, first phase, amplitude and second phase control signals further comprises the step of applying with particularity so as to permit simultaneous strip map and spotlight synthetic aperture radar functionality through a common aperture of said radio frequency radiating/receiving elements.

27. The method of claim 13, wherein said step of applying said frequency, first phase, amplitude and second phase control signals further comprises the step of applying with particularity so as to permit simultaneous ground moving target indication and spotlight synthetic aperture radar functionality through a common aperture of said radio frequency radiating/receiving elements.

28. The method of claim 13, wherein said step of applying said frequency, first phase, amplitude and second phase control signals permits simultaneous communications and radar functionality through a common aperture of said radio frequency radiating/receiving elements.

29. The method of claim 13, wherein said step of applying said frequency, first phase, amplitude and second phase control signals provides adaptive processing.

\* \* \* \* \*